Jan. 20, 1948. J. FERLA 2,434,690
MACHINE FOR PRODUCING ASBESTOS-CEMENT PIPES
Original Filed Oct. 19, 1939 3 Sheets-Sheet 1
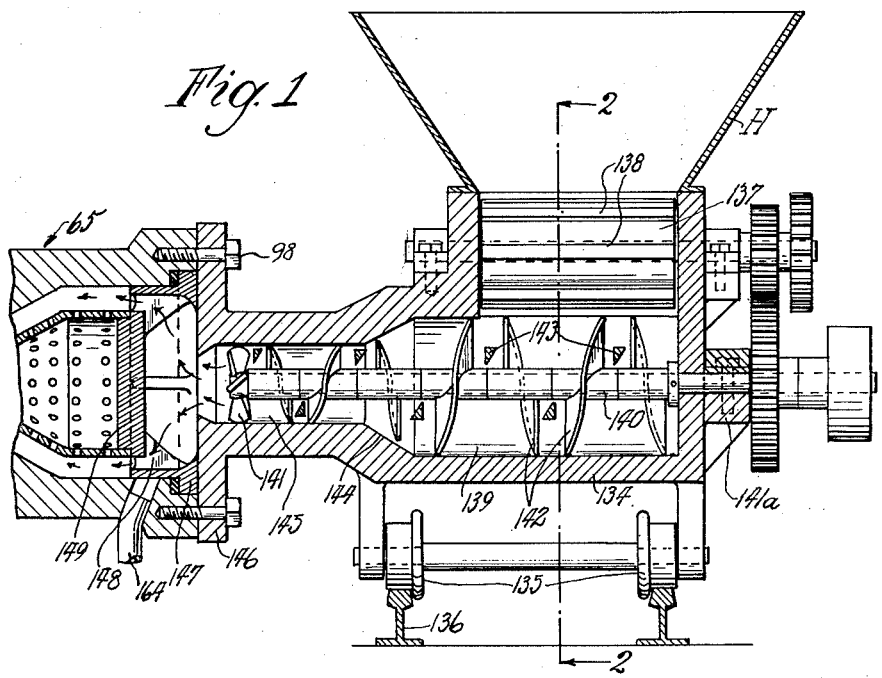
Inventor
John Ferla
by Henry Mesh
Attorney Jan. 20, 1948.  J. FERLA  2,434,690
MACHINE FOR PRODUCING ASBESTOS-CEMENT PIPES
Original Filed Oct. 19, 1939  3 Sheets-Sheet 2
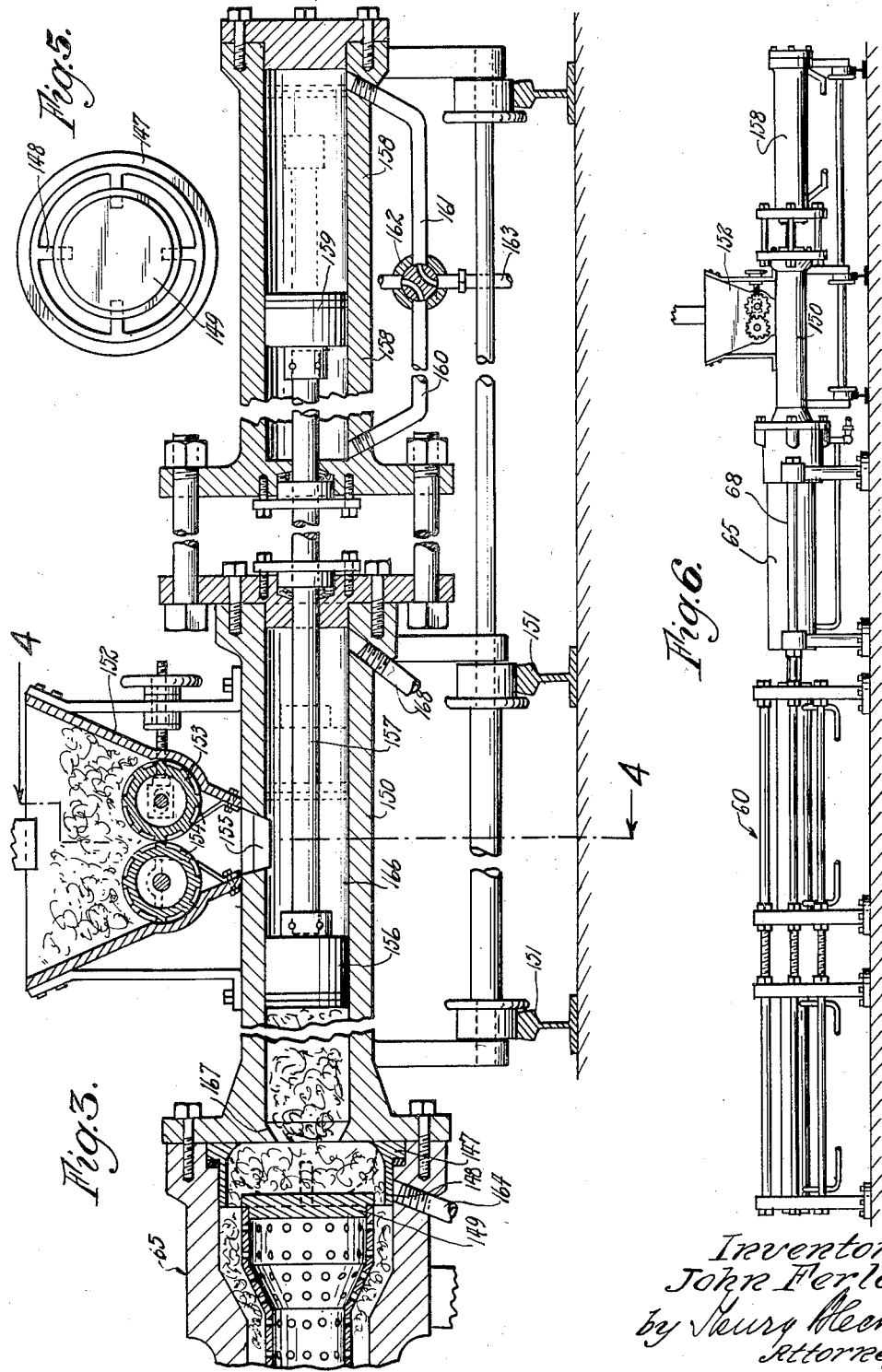

Jan. 20, 1948.  J. FERLA  2,434,690
MACHINE FOR PRODUCING ASBESTOS-CEMENT PIPES
Original Filed Oct. 19, 1939   3 Sheets-Sheet 3

Inventor
John Ferla
by Henry Mech
Attorney.

Patented Jan. 20, 1948

2,434,690

UNITED STATES PATENT OFFICE 2,434,690

MACHINE FOR PRODUCING ASBESTOS-CEMENT PIPES

John Ferla, East Orange, N. J., assignor of one-fourth to Paul X. Blaettler, Oaklyn, N. J., and three-fourths to U. S. Asbestos Cement Pipe Company, Camden, N. J., a corporation of New Jersey Original application October 19, 1939, Serial No. 300,275. Divided and this application March 7, 1944, Serial No. 525,448

9 Claims. (Cl. 92—54)

This application is a division of my application on Machines for producing pipes, Ser. No. 300,275, filed October 19, 1939, now Patent No. 2,374,086, granted April 17, 1945, which in turn was a continuation-in-part of my prior application on Method of producing tubes, Ser. No. 184,509, filed January 12, 1938, now Patent No. 2,177,643, granted October 31, 1939.

This invention relates to the manufacture of asbestos cement pipe, such as is made from a mixture of Portland cement and asbestos fibers mixed together and formed into a mass of plastic material.

It has been the practice heretofore to manufacture asbestos cement pipe by the accumulation of a layer or layers on a mandrel until the desired thickness is made, after which the material is dried and treated until the mass hardens and sets.

The object of this invention is to improve the manufacture of such asbestos cement pipe by eliminating the necessity for rolling up the layers on the mandrel, and instead, producing the pipe in a continuous manner, by mixing the material and extruding the same in the form of a tube. The material is forced preferably into a mold around a mandrel where it is formed in the proper and desired shape to produce a pipe of the required length. The pipe may be made in this way with a bell collar, although the mandrel and mold are not required necessarily, if the pipe is to be made in continuous uniform size.

The invention contemplates the provision of an extrusion device including a screw operatively mounted in a casing for extruding the material therefrom in the form of a tube, provision being made for uniformly working the plastic mass to distribute the fibers through the cementitious material during the extrusion process.

Another feature of the invention resides in the provision of a mold and mandrel combined adapted to form the pipe with a bell collar thereon when plastic material, such as a mixture of asbestos and cement, is forced under pressure into the mold. This provides for the shaping and forming of the pipe in a simple and effective manner, and yet provides a pipe of the required shape and density of structure which will be effective for many uses to which asbestos cement pipes are capable of being applied.

The invention is shown as applied in the accompanying drawings in which:

Fig. 1 is a longitudinal section of the extrusion apparatus for forming the pipe;

Fig. 2 is a vertical cross section therethrough on the line 2—2 of Fig. 1;

Fig. 3 is a longitudinal sectional view of a modified form of extrusion apparatus;

Fig. 4 is a vertical cross section therethrough on the line 4—4 of Fig. 3;

Fig. 5 is a detail edge view of the demountable ring used in forming the tube, removed from the apparatus;

Fig. 6 is a side elevation of the assembly of apparatus for molding and compressing the pipes;

Referring first to Fig. 6, this shows the assembly of an extrusion device associated with molding apparatus in which pressure may be applied to the formed or molded pipe hydraulically or by other fluid power. The hydraulic power device is here designated generally by the numeral 60 and is associated with a molding device indicated at 65, provision being made for feeding the plastic material such as a mixture of asbestos fibers and cement, into the molding device for shaping and forming such mass into a pipe of the required shape and size.

Figure 7:
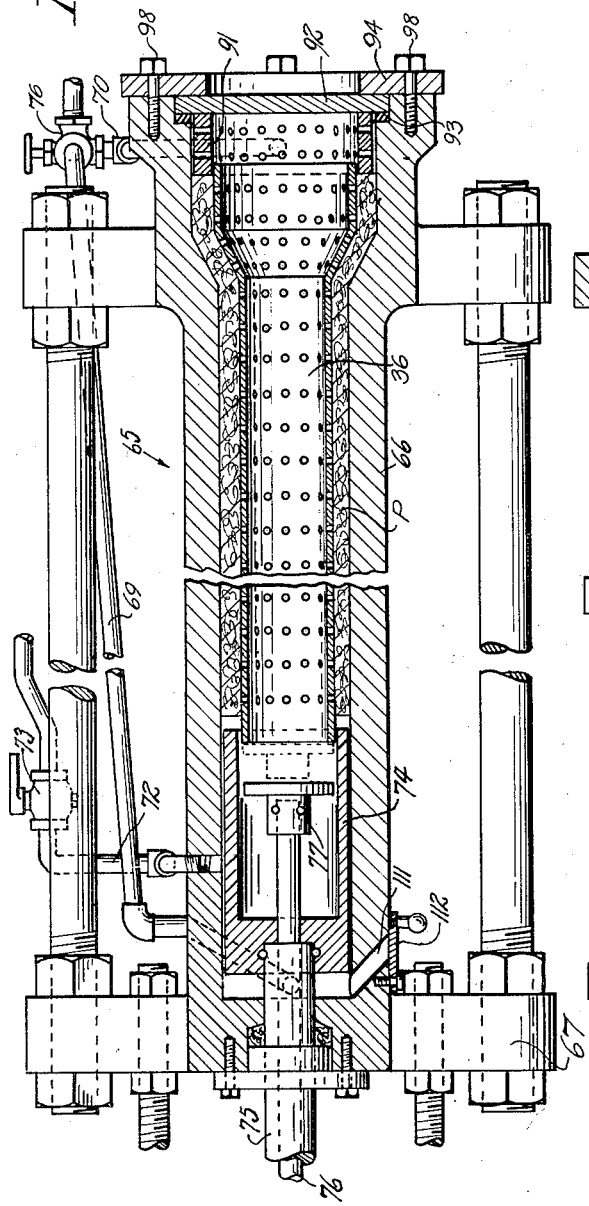
Fig. 7 is a longitudinal sectional view through the compression machine.

The molding apparatus is shown in detail in Fig. 7, where this apparatus is shown as provided with a casing 66 having an internal cavity of the general outline of the tube to be formed, including a bell collar on the tube. The casing 66 is supported on standards 67 connected together through tie rods 68.

A mandrel is shown at 36 suitably mounted within the chamber of the casing 66. The mandrel 36 is shown as of tubular form and radially perforated to allow the moisture to pass through the wall of the mandrel from the material under compression therearound. When it is desired to make a pipe with a bell collar on one end thereof, the mandrel 36 should be formed with an enlarged bell portion at one end of a size substantially to shape the inner surface of the bell end of the pipe. The periphery of the pipe is shaped by the inner cavity or chamber formed in the casing 66.

A vacuum tube 69 extends to the rear end of the chamber or cavity formed in the casing 66, and has a branch pipe 70 controlled by a valve 71, extending to the forward end of the casing chamber. Also connected with the casing chamber at a side thereof is a pipe 72, provided with a control valve 73, to admit air or water into the casing when desired by the operator.

A hollow piston 74 is slidably mounted in the inner end of the cavity of the casing 66, and is preferably of slightly smaller diameter than said chamber. The piston 74 is mounted on and secured to a piston rod 75 which is hollow and extends outwardly through a stuffing box in one end of the casing 66. The hollow piston rod 75 surrounds another piston rod 76 which projects into the piston 74. The forward end of the piston rod 76 has secured thereon a piston 77 which has a diameter sufficient to contact with the surrounding wall of the mandrel 36 at one end of said mandrel, as shown in dotted lines in Fig. 7.

Figure 8:
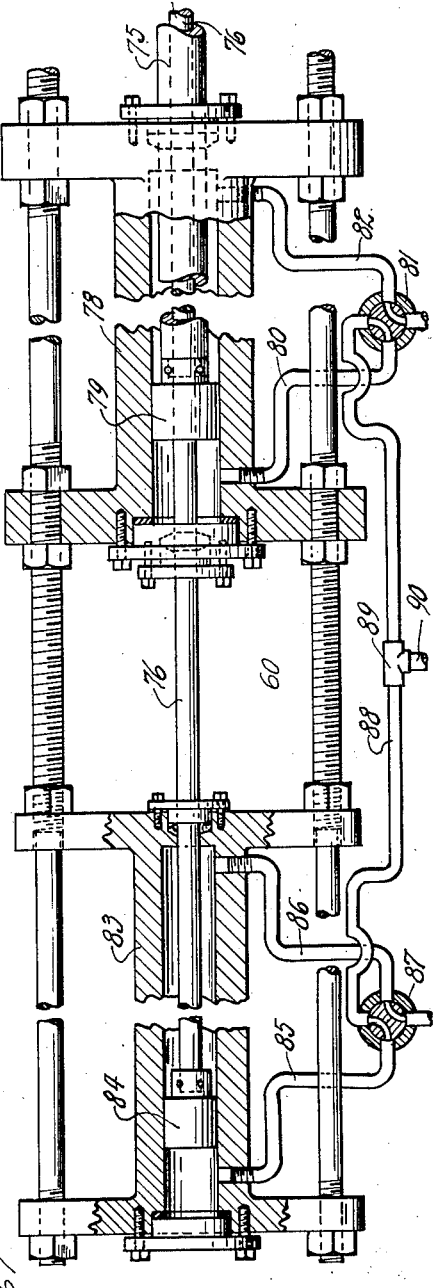
Fig. 8 is a similar view through the hydraulic power device used in connection therewith.

The pistons 74 and 77 are operated by a hydraulic power device 60 shown generally in Fig. 8. The hydraulic power device is provided with a cylinder 78 in which a piston 79 is operatively mounted and connected with the piston rod 75. The piston 79 is operated by hydraulic pressure admitted into the cylinder 78 through a pipe 80 at one end of the cylinder, leading to a control valve 81 from which a pipe 82 also leads to the opposite end of the cylinder 78. The valve 81 controls the admission of fluid alternately through the respective pipes 80 and 82 for causing reciprocating movement of the piston 79.

The piston rod 76 extends through the cylinder 78 and into a cylinder 83 where it is connected with a piston 84. Pipes 85 and 86 are connected with opposite ends of the cylinder 83, extending to a control valve 87. A pipe 88, connected through a fitting 89 with a source of hydraulic pressure 90, leads to the respective valves 81 and 87 for supplying hydraulic pressure thereto.

The plastic material is adapted to be forced into the casing 66 between the latter and the mandrel 36, as shown at P in Fig. 7. It will be noted that the mandrel 36 slidably fits into the hollow piston 74, whereby the piston closes one end of the plastic space. The mandrel 35 is supported at its opposite end by a perforated ring 91 which is inserted into the space between the mandrel 36 and the inner chamber 66, after the plastic material has been applied thereto, which ring 91 is slightly smaller in external diameter than the diameter of the chamber in the casing 66, and also perforated, for the passage of water through the wall of the ring.

The outer end of the chamber is closed by a removable plate 92 fitted thereover and sealed by a packing ring 93, the plate 92 is held in place by a removable door 94 secured to the end of the casing by screws 98, as shown in Fig. 7.

When the compression device is being used to form a pipe, a ring 147 is inserted into the end of the casing 66, in place of the ring 91. The ring 147 (shown in Fig. 1) is provided with spaced lugs 148 bearing upon a disc 149 fitted into the enlarged end of the mandrel 36, closing said mandrel.

The compression device shown in Figs. 1 and 2 comprises an extrusion device including a hopper H supported upon a casing 134. The casing 134 is mounted on wheels 135 adapted to travel on rails 136, so as to be moved into and out of alignment with the molding device described above, whenever desired. The hopper H is adapted to receive the plastic mixture to be used in forming the pipe.

Extending transversely of the casing 134, at the bottom of the hopper H, is a pair of rollers 137 formed with longitudinal bars or ribs 138 which interfit with each other, as shown in Fig. 2. Upon rotation of the rollers 137, the bars or ribs 138 feed the material positively downward from the hopper into the casing 134, and into the feed screw 142.

The chamber 139 is closed at one side while the opposite end of the casing is reduced in diameter to form a narrow passage 145 which is connected with the enlarged portion of the chamber through a conical slope or passage 144. As material is forced lengthwise of the chamber 139 and through the conical passage 144, and the constricted passage 145, the material is compressed before it is fed into the mold.

Extending lengthwise through the chamber 139 is a shaft 140, which projects also into and substantially through the constricted portion 145. The shaft 140 has a sectionized screw conveyor 142 mounted thereon, the segments forming the screw conveyor substantially fitting the peripheral portions of the chamber and passages in which they are mounted. One end of the shaft 140 is mounted in a bearing 141a, while the opposite end portion of the shaft is carried by the bearing relation of the screw conveyor sections in the chamber and passageway.

A propeller 141 is mounted on the shaft 140 at the discharge end of the screw conveyor 142 within the narrow passage 145 to force the material therefrom into the molding device. Transverse bars or blades 143 (see Fig. 2) extend at right angles to the shaft 140 into the spaces between the sections of the conveyor 142. The bars or blades 143 have sharpened edges to cut the material, causing thorough mixing of the asbestos fibers through the cement, and prevent lumping.

When the compression device is brought into alignment with the molding device 65, it is adapted to be secured directly to the end of the casing 66. A flange 146 on the casing 134 is secured to the end of the casing 66 by the screws 98, after removal of the door 94 and plate 92, and replacing the ring 91 by the ring 147 and a disc 149, in the relation shown in Fig. 1. Then upon the operation of the extrusion machine, the material is fed by the conveyor 142 therethrough and into the mold device 65 until the latter is filled with sufficient quantity to form the molded pipe. Then the extrusion machine is removed and the molding apparatus closed by the parts shown in Fig. 7, after which the hydraulic power device is operated to apply pressure by the piston 74 against the end of the formed pipe P to press the material and shape the pipe in the molding device.

The casing of the molding device has an outlet 164 for blowing out accumulations of material particles and foreign substance after the molding operation.

In the modified form shown in Figs. 3 and 4, the screw device is replaced by a reciprocating pressure device actuated by means of a hydraulic press. This hydraulic extrusion device includes a casing 150 which is preferably considerably longer than the casing 134 in Fig. 1, and is connected with the hydraulic actuating mechanism therefor, forming a rigid structure that is mounted to travel on three rails 151. The casing 150 has a chamber 166 therein adapted to receive cementitious material from a hopper 152. Rollers 153 are operatively mounted in the hopper 152, and each roller has miter ribs 154 on the periphery thereof arranged in coacting and interfitting relation with the ribs on the adjacent roller, whereby the rollers feed the material uniformly from the hopper through an opening 155 in the top of the casing 150, into the chamber 166 therein.

A piston 156 is operatively mounted in the chamber 166 on a piston rod 157 extending from the casing 150 into a second casing 158 that is connected with the casing 150 by tie rods in a rigid relation. A piston 159 is mounted on the end of the piston rod 157 in the casing 158 and constitutes the operating means for the extrusion device. Hydraulic pressure is imparted to the piston 159 through pipes 160 and 161, extending respectively to opposite ends of the cylinder in the casing 158, and being controlled by a valve 162 connected with a source of hydraulic pressure through a pipe line 163.

The chamber 166 in the casing 150 is reduced at its discharge end 167 where it opens into the molding device to increase the compression of the material as it is discharged from the extrusion device. The casing 150 has an outlet 168 for removing foreign substances therefrom.

In the operation of this device, the piston 159 is first moved to the position shown in dotted lines in Fig. 3, and the rollers 153 are operated to feed the cementitious material from the hopper 152 into the chamber 166 in advance of the piston 156. When this chamber is filled, the hydraulic pressure is turned into the right hand end of the cylinder in the casing 158, forcing the pistons 156, 159, to advance as shown in full lines in Fig. 3. This action forces the material from the chamber 166 into the mold 65 around the mandrel mounted therein as described above to mold a pipe around the mandrel. Thereafter, the hydraulic pressure is reversed and turned through the pipe 160 to force the pistons to the right in Fig. 3 to the dotted line positions shown therein, after which a new charge of material is inserted in the chamber 166. One or more charges may be used to supply material for each pipe, according to the relative sizes of the mold and charging chamber.

Provision is made in the apparatus shown in Fig. 7 for extracting the water from the pipe by connecting a source of vacuum at one or both opposite ends of the cylinder 66. This connection may be made through the pipe 70 at one end and the pipe 69 at the opposite end, which will facilitate drying of the formed pipe throughout its length. The water will pass out of the cementitious pipe through the perforations in the mandrel as described above.

Referring again to Fig. 7, attention is called to the provision of a blow out opening 111, controlled by a slide valve 112, permitting particles of materials, or any foreign substances, to be blown out by opening the valve 73, so that water may flow between the piston 74 and the casing wall to escape through the opening 111, carrying along the foreign substances.

I claim:

1. In apparatus for forming a pipe, the combination of an elongated compression chamber having an inlet at one end thereof adapted to receive a fibrous cementitious composition therethrough, said chamber having a cylindrical portion of smaller diameter than the chamber and connected at one end by a tapered portion therewith, said cylindrical portion having a discharge opening at the opposite end thereof for extrusion of the composition therefrom, and a screw mounted in the chamber for working the composition therethrough to the discharge end thereof, said screw having a thread portion of smaller pitch in said cylindrical portion than the thread portion thereof in the compression chamber.

2. In apparatus for forming a pipe, the combination of an elongated compression chamber having an inlet at one end thereof adapted to receive a fibrous cementitious composition therethrough, said chamber having a cylindrical portion of smaller diameter than the chamber and connected at one end by a tapered portion therewith, said cylindrical portion having a discharge opening at the opposite end thereof for extrusion of the composition therefrom, a screw mounted in the chamber for working the composition therethrough to the discharge end thereof, said screw having portions of different diameters in the compression chamber and cylindrical portion respectively, and knife blade means mounted in the chamber for imparting slicing action through the material during feeding of the material.

3. In apparatus for forming a pipe, the combination of an elongated compression chamber having an inlet at one end thereof adapted to receive a fibrous cementitious composition therethrough, said chamber having a discharge opening at the opposite end thereof for extrusion of the composition therefrom, a screw mounted in the chamber for working the composition therethrough to the discharge end thereof, a hopper arranged to supply material to the inlet opening, and operative feeding means for forcing the material from the hopper into the screw, said feeding means including coacting rollers having interfitting peripheral ribs arranged to force the material into the chamber.

4. In apparatus for forming a pipe, the combination of an elongated compression chamber having an inlet at one end thereof adapted to receive a fibrous cementitious composition therethrough, said chamber having a discharge opening at the opposite end thereof for extrusion of the composition therefrom, a mold shaped to form a pipe with a bell collar on an end thereof, means connecting said bell-forming end of the mold with the compression chamber at the outlet thereof, and extrusion means for forcing the composition from the compression chamber into the mold, said bell-forming portion of the mold being of appreciably greater diameter than the discharge opening from the compression chamber for expansion of the composition into the mold.

5. In apparatus for forming a pipe, a mold having an inner cavity, a mandrel within the mold, means mounting the mandrel in the mold spaced from the wall of the cavity including a ring surrounding an end of mandrel, said ring having openings therethrough about the periphery of the mandrel, pressure means at the opposite end of the mandrel and including means operating between the mandrel and the mold for imparting endwise pressure to the formed pipe on the mandrel.

6. In apparatus for forming a pipe, a mold having an inner cavity shaped to form the external surface of the pipe, a mandrel within the mold and shaped to form the inner surface of the pipe, and means mounting said mandrel in the mold spaced from the wall of the cavity, said mandrel having perforations therethrough for draining moisture from the pipe to the interior of the mandrel, said mounting means including a ring surrounding an end of the mandrel and substantially closing the space between the mandrel and the mold cavity, and means for applying pressure against the opposite end portion of the formed pipe in opposed relation to said ring.

7. In apparatus for forming a pipe, a mold having an inner cavity shaped to form the external surface of the pipe, a mandrel within the mold and shaped to form the inner surface of the pipe, and means mounting said mandrel in the mold spaced from the wall of the cavity, said mandrel having perforations therethrough for draining the moisture from the pipe to the interior of the mandrel, said mounting means including a ring surrounding an end of the mandrel and substantially closing the space between said mandrel and the mold cavity, and fluid pressure operated means at the opposite end of the mandrel and arranged in relation to act lengthwise of the mandrel for applying endwise pressure to the formed pipe on the mandrel at a point between the mandrel and the mold cavity to compact the pipe and to force the moisture therefrom.

8. In apparatus for forming a pipe, a mold having an inner cavity shaped to form the external surface of the pipe, a mandrel within the mold and shaped to form the inner surface of the pipe, and means mounting said mandrel in the mold spaced from the wall of the cavity, said mandrel having perforations therethrough for draining the moisture from the pipe to the interior of the mandrel, said mounting means including a ring surrounding an end of the mandrel and substantially closing the space between said mandrel and the mold cavity, a piston slidably interposed between the opposite end of the mandrel and the mold, and means connected with the piston to move the same relative to the mandrel for compressing the material in the direction of the ring to compact the pipe and to force the moisture therefrom.

9. In apparatus for forming a pipe, a mold having an inner cavity shaped to form the external surface of the pipe, a mandrel within the mold and shaped to form the inner surface of the pipe, and means mounting said mandrel in the mold spaced from the wall of the cavity, said mandrel having perforations therethrough for draining the moisture from the pipe to the interior of the mandrel, said mounting means including a ring surrounding an end of the mandrel and substantially closing the space between said mandrel and the mold cavity, a piston slidably interposed between the opposite end of the mandrel and the mold, and means connected with the piston to move the same relative to the mandrel for compressing the material in the direction of the ring to compact the pipe and to force the moisture therefrom, and means connected with the mold at the periphery of the cavity adjacent opposite ends of the cavity for removing the moisture therefrom upon compression of the pipe.

JOHN FERLA.

REFERENCES CITED

The following references are of record in the file of this patent:

UNITED STATES PATENTS

| Number | Name | Date |
|---|---|---|
| 1,273,527 | Norris | July 23, 1918 |
| 293,000 | Fate et al. | Feb. 5, 1884 |
| 711,493 | Gottschalk | Oct. 21, 1902 |
| 1,858,956 | Hepperle | May 17, 1932 |
| 965,002 | Pauly | July 19, 1910 |
| 1,363,912 | Pauly | Dec. 28, 1920 |
| 1,875,738 | Jones | Sept. 6, 1932 |
| 2,144,213 | Bassett et al. | Jan. 17, 1939 |
| 1,026,887 | Van Deventer | May 21, 1912 |
| 1,072,495 | Priest | Sept. 9, 1913 |
| 2,030,758 | Naturkaoz | Feb. 11, 1936 |

FOREIGN PATENTS

| Number | Country | Date |
|---|---|---|
| 363,873 | Great Britain | Dec. 31, 1931 |
| 162,082 | Switzerland | Aug. 16, 1933 |